(12) United States Patent
May et al.

(10) Patent No.: US 11,226,048 B2
(45) Date of Patent: Jan. 18, 2022

(54) PASSIVE EXPLOSION ISOLATION VALVE WITH VERTICALLY ORIENTED FLAPS

(71) Applicant: Fike Corporation, Blue Springs, MO (US)

(72) Inventors: Brian A. May, Greenwood, MO (US); Andrew Tworek, Overland Park, KS (US); Dan A. Malott, Chilhowee, MO (US)

(73) Assignee: Fike Corporation, Blue Springs, MO (US)

( * ) Notice: Subject to any disclaimer, the term of this patent is extended or adjusted under 35 U.S.C. 154(b) by 52 days.

(21) Appl. No.: 16/793,052

(22) Filed: Feb. 18, 2020

(65) Prior Publication Data

US 2020/0263797 A1 Aug. 20, 2020

Related U.S. Application Data

(60) Provisional application No. 62/807,405, filed on Feb. 19, 2019.

(51) Int. Cl.

| | |
|---|---|
| *F16K 17/36* | (2006.01) |
| *F16K 25/02* | (2006.01) |
| *F16K 1/20* | (2006.01) |
| *F16K 1/50* | (2006.01) |

(52) U.S. Cl.
CPC .......... *F16K 17/363* (2013.01); *F16K 1/2021* (2013.01); *F16K 25/02* (2013.01); *F16K 1/50* (2013.01); *Y10T 137/7839* (2015.04); *Y10T 137/7845* (2015.04)

(58) Field of Classification Search
CPC .... F16K 15/033; F16K 15/035; F16K 15/036; F16K 17/363; F16K 25/02; Y10T 137/7839; Y10T 137/7845; Y10T 137/7869; Y10T 137/787; B01D 46/0093
See application file for complete search history.

(56) References Cited

U.S. PATENT DOCUMENTS

| | | | |
|---|---|---|---|
| 3,718,156 A | * | 2/1973 | Fujii .................. F16K 17/0446 137/512.1 |
| 4,079,751 A | | 3/1978 | Partridge et al. |
| 4,380,188 A | * | 4/1983 | Nichols .................... A62C 2/12 454/297 |

(Continued)

FOREIGN PATENT DOCUMENTS

| | | |
|---|---|---|
| EP | 0611907 | 8/1994 |
| WO | 2017168162 | 10/2017 |

OTHER PUBLICATIONS

International Search Report and Written Opinion in corresponding PCT Application No. PCT/US2020/018548, dated Jun. 24, 2020.

*Primary Examiner* — Hailey K. Do
(74) *Attorney, Agent, or Firm* — Hovey Williams LLP

(57) ABSTRACT

A passive explosion isolation valve (10) is provided that comprises vertically-oriented gate members (40, 42) configured to close automatically in response to an energetic event occurring downstream of the valve. The valve (10) may be optionally equipped with a valve seat cleaning assembly (46) configured to removed accumulated particulate material away from the area of the valve seat (48) and/or one or more latch assemblies (44) configured to secure the gate members (40, 42) in the closed position following closure of the valve (10) in response to an energetic event.

32 Claims, 10 Drawing Sheets

(56) References Cited

U.S. PATENT DOCUMENTS

| | | | | |
|---|---|---|---|---|
| 4,474,167 A | * | 10/1984 | McCabe | A62C 2/14 |
| | | | | 126/287.5 |
| 5,277,658 A | | 1/1994 | Goettl | |
| 5,669,815 A | | 9/1997 | Cakebread | |
| 5,793,610 A | | 8/1998 | Schmitt et al. | |
| 6,042,348 A | | 3/2000 | Aakalu et al. | |
| 6,126,540 A | | 10/2000 | Janu et al. | |
| 6,131,594 A | | 10/2000 | Staggs et al. | |
| 9,033,778 B2 | | 5/2015 | Jackson | |
| 9,605,868 B2 | | 3/2017 | Carlyon | |
| 9,933,078 B2 | | 4/2018 | Garnett et al. | |
| 2003/0227141 A1 | * | 12/2003 | Cornelius | F16J 15/46 |
| | | | | 277/609 |
| 2005/0255967 A1 | | 11/2005 | Foster et al. | |
| 2007/0000671 A1 | | 1/2007 | Reilly et al. | |
| 2007/0218828 A1 | | 9/2007 | Baik | |
| 2008/0035873 A1 | | 2/2008 | Wark | |
| 2008/0233861 A1 | | 9/2008 | Jenkins et al. | |
| 2013/0234054 A1 | | 9/2013 | Eijkelenberg et al. | |
| 2014/0033910 A1 | | 2/2014 | Bauck et al. | |
| 2018/0328507 A1 | * | 11/2018 | Balcarczyk | F16K 17/164 |

* cited by examiner

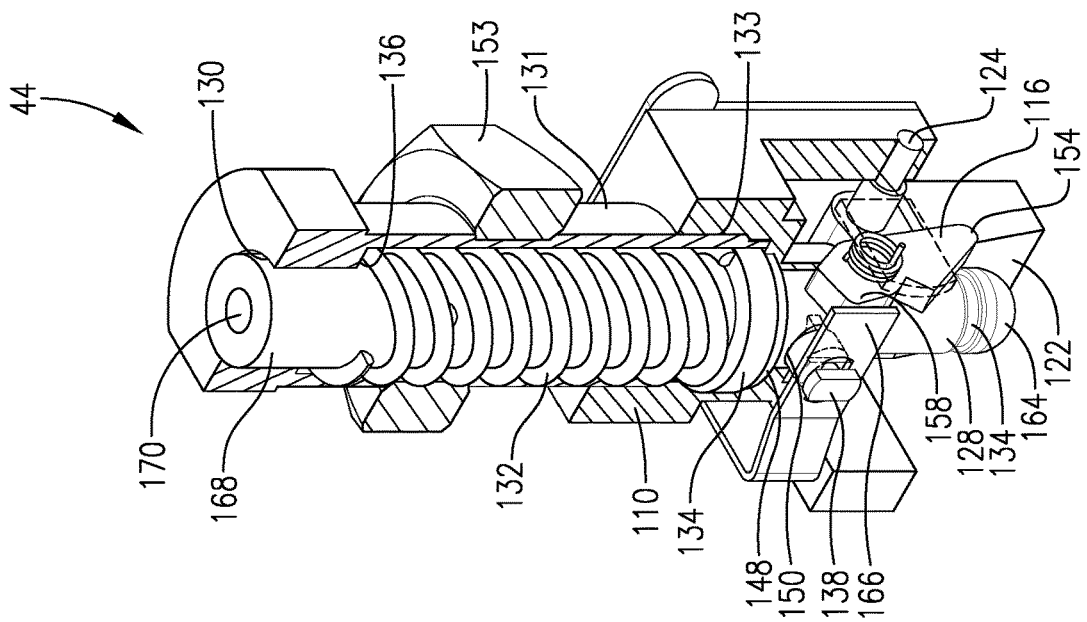
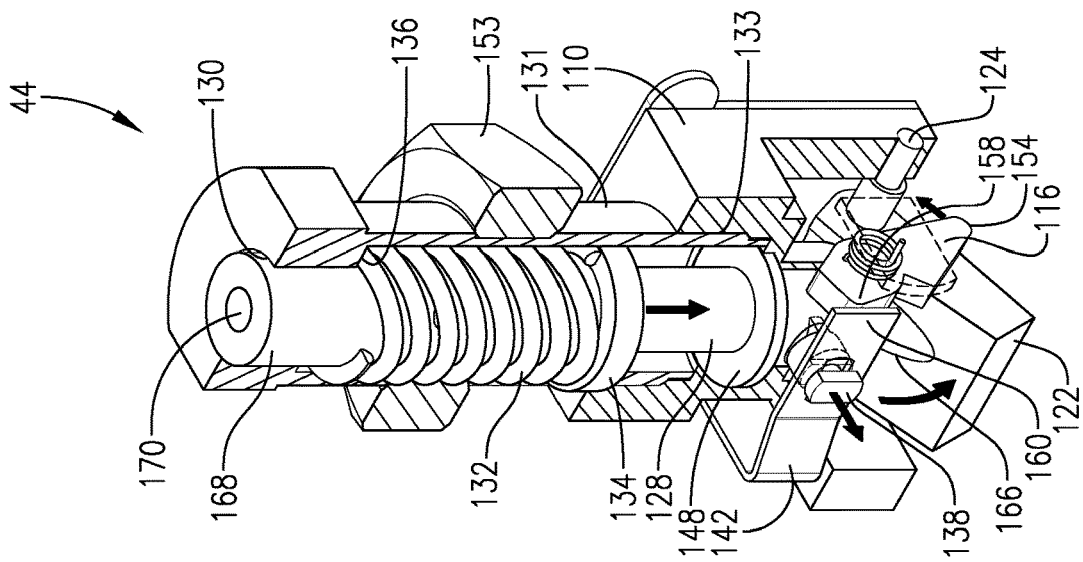
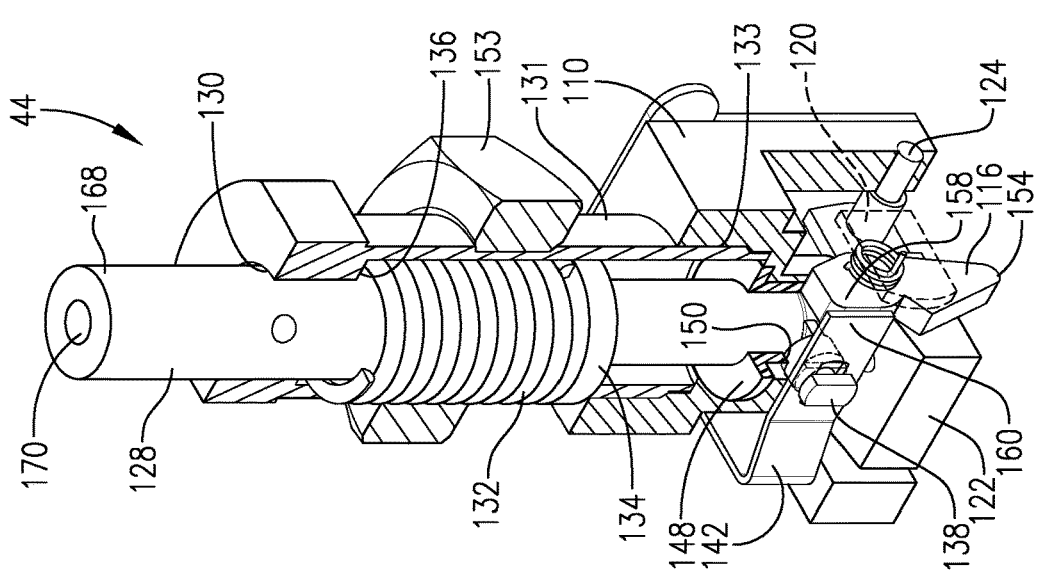

PASSIVE EXPLOSION ISOLATION VALVE WITH VERTICALLY ORIENTED FLAPS

CROSS-REFERENCE TO RELATED APPLICATIONS

The present application claims the priority benefit of U.S. Provisional Application No. 62/807,405, filed Feb. 19, 2019, entitled PASSIVE EXPLOSION ISOLATION VALVE WITH VERTICALLY ORIENTED FLAPS, incorporated by reference in its entirety herein.

BACKGROUND OF THE INVENTION

Field of the Invention

The present invention is generally directed toward a passive explosion isolation valve that comprises vertically-oriented flaps that are open during normal valve operation permitting communication between the valve inlet and valve outlet, but close automatically in response to an energetic event occurring downstream of the valve. Valves according to the present invention may also be optionally equipped with valve seat cleaning assemblies configured to remove particulate material that has accumulated near the valve seat and that might interfere with complete closure of the flaps in response to the energetic event. In addition, valves according to the present invention may also be provided with latch assemblies that secure the flaps in the closed position following the energetic event until it is desired to reopen the valve.

Description of the Prior Art

Certain kinds of industrial plants employ dust collection systems for removing fine particulate matter from material processing equipment to avoid discharge of the particulate matter into the environment. Such dust collection systems often comprise a baghouse or similar dust collection apparatus in which the particulate matter is collected prior to venting of the air stream into the atmosphere. The particulate matter collected may be highly flammable or even explosive. Isolation devices, in particular isolation valves, are often employed to protect upstream equipment from the disastrous consequences of an explosion within the dust collection apparatus.

Isolation valves can be of the active or passive type. Active isolation valves generally require mechanical actuation in response to a detected hazardous condition, such as a deflagration wave or flame front. Active isolation valves may be of the gate valve-type, such as disclosed in U.S. Pat. No. 6,131,594, in which shifting of a gate member is effected through actuator apparatus. Another type of active isolation valve is a pinch valve, such as disclosed in U.S. Patent Application Publication No. 2013/0234054, in which an inner sleeve is compressed. As with a gate-type isolation valve, closure of the pinch valve sleeve is effected through an actuator device. Active isolation valves, while effective, are generally more complex and require the installation of detection equipment capable of identifying the onset of a hazardous energetic event and triggering the valve-closing actuator, thus resulting in increased capital cost.

Passive isolation valves are generally much less complex and do not rely upon detection devices for their actuation. Rather, passive isolation valves are generally responsive to environmental changes, such as the energetic event itself or changes in pressure or direction of fluid flow. As such, passive isolation valves generally are not actively monitored to ensure their operational readiness, apart from routine inspection and maintenance.

Traditionally, many passive isolation valves have comprised a horizontally-hinged gate element, such as that illustrated in U.S. Pat. No. 9,933,078, although such traditional gate elements have more commonly been configured as flat, rather than contoured, members. Nevertheless, being horizontally-hinged has meant that gravitational forces must be considered when designing the gate element as the process stream or any mechanical assisting device must be capable of pivoting the gate element to a valve open position during normal operation of the process equipment, which means that the weight of the gate element that will naturally tend to bias the gate element to the closed position must be overcome. As the valve diameter increases, the size of the gate element required also increases, which adds weight to the gate element. To conserve weight, the gate element may be constructed from thinner material. Additionally, a larger gate element results in a greater path of travel that for the gate element when shifting between the valve open and valve closed positions leading to longer closure times in response to an energetic event.

Hinged gate elements have also been known to suffer from valve "chattering," which is the occasional slamming of the gate element against the valve seat and/or stop members due to normal fluctuations in flow of the process stream through the valve. If the gate element is constructed of too thin of material, this chatter can lead to deformation of the gate element and failure of the gate element to properly block communication between the valve inlet and valve outlet when the valve has shifted to a closed position in response to a downstream energetic event. Thus, upstream process equipment may not be effectively isolated from the effects of the energetic event.

In dust collection systems, accumulation of particulate matter near the valve can adversely impact the valve's effectiveness in preventing propagation of an energetic event by interfering with full closure of the valve's gate element. The '078 patent discloses one solution to this problem. However, the described solution is specific to the particular valve shown having a horizontally-hinged gate element.

SUMMARY OF THE INVENTION

The present invention seeks to overcome one or more of the shortcomings noted above with prior art passive isolation valves. According to one embodiment of the present invention the problems associated valves comprising a horizontally-hinged gate element is addressed by dividing the valve closure into two independent and smaller masses. In addition, the smaller gate elements may be vertically-hinged to lessen or remove the impact of gravitational forces acting thereon. According to one particular embodiment there is provided a passive isolation valve comprising a valve body, a gate assembly secured to the valve body that comprises a pair of vertically-hinged gate members, and one or more latch assemblies. The valve body comprises a valve inlet, a valve outlet, and a valve passage through the valve body that interconnects the inlet and outlet. The gate members are shiftable, in response to an energetic event downstream of the valve outlet, between a valve open position, in which the valve inlet is in communication with the valve outlet, and a valve closed position, in which the gate members block communication between the valve inlet and the valve outlet. The gate assembly further comprises at least one biasing mechanism configured to bias the gate members toward the valve open position. The one or more latch assemblies are configured to be deployed in response to shifting of the gate members to the valve closed position and to hold the gate members in the valve closed position.

According to another embodiment of the present invention the problem of accumulation of particulate material that affects valve closure is addressed by providing a novel valve seat cleaning assembly. In particular, there is provided a passive isolation valve comprising a valve body, a gate assembly secured to the valve body comprising one or more hinged gate members, a valve seat, and a valve seat cleaning assembly configured to remove accumulated particulate matter from the vicinity of the valve seat. The valve body comprises a valve inlet, a valve outlet, and a passage through the valve body interconnecting the valve inlet and the valve outlet. The one or more hinged gate members are shiftable, in response to an energetic event downstream of the valve outlet, between a valve open position, in which the valve inlet is in communication with the valve outlet, and a valve closed position, in which the one or more gate members block communication between the valve inlet and the valve outlet. The one or more gate members contact against the valve seat when in the valve closed position. The valve seat cleaning assembly is configured to remove accumulated particulate matter from the vicinity of the valve seat that might interfere with seating of the one or more gate members against the valve seat during shifting of the one or more gate members between the valve open and the valve closed positions. The valve seat cleaning assembly comprises a gas-directing channel and a gas-dispersing guide that faces the gas-directing channel. The gas-dispersing guide comprises a plurality of ports that are in communication with the gas-directing channel and configured to disperse a gas flowing through the gas-directing channel into the passage in the vicinity of the valve seat.

According to yet another embodiment of the present invention there is provided a passive isolation valve comprising a valve body, a gate assembly secured to the valve body comprising one or more hinged gate members, and at least one latch assembly for the one or more gate members. The valve body comprises a valve inlet, a valve outlet, and a passage through the valve body interconnecting the valve inlet and the valve outlet. The gate members are shiftable, in response to an energetic event downstream of the valve outlet, between a valve open position, in which the valve inlet is in communication with the valve outlet, and a valve closed position, in which the one or more gate members block communication between the valve inlet and the valve outlet. The at least one latch assembly is configured to be deployed in response to shifting of the gate members to the valve closed position and to hold the gate members in the valve closed position. The at least one latch assembly comprises a trigger configured to be contacted by the one or more gate members during shifting of the one or more gate members between the valve open and valve closed positions, a securing element configured to restrict movement of the one or more gate members from the valve closed position, and a shiftable body that is configured, upon activation of the trigger, to move the securing element into engagement with the one or more gate members.

BRIEF DESCRIPTION OF THE DRAWINGS

FIG. 10A is a sectioned view of the latch assembly in the undeployed configuration;

FIG. 10B is a sectioned view of the latch assembly in a partially deployed configuration; and FIG. 10C is a sectioned view of the latch assembly in a fully deployed configuration.

Figure 1:
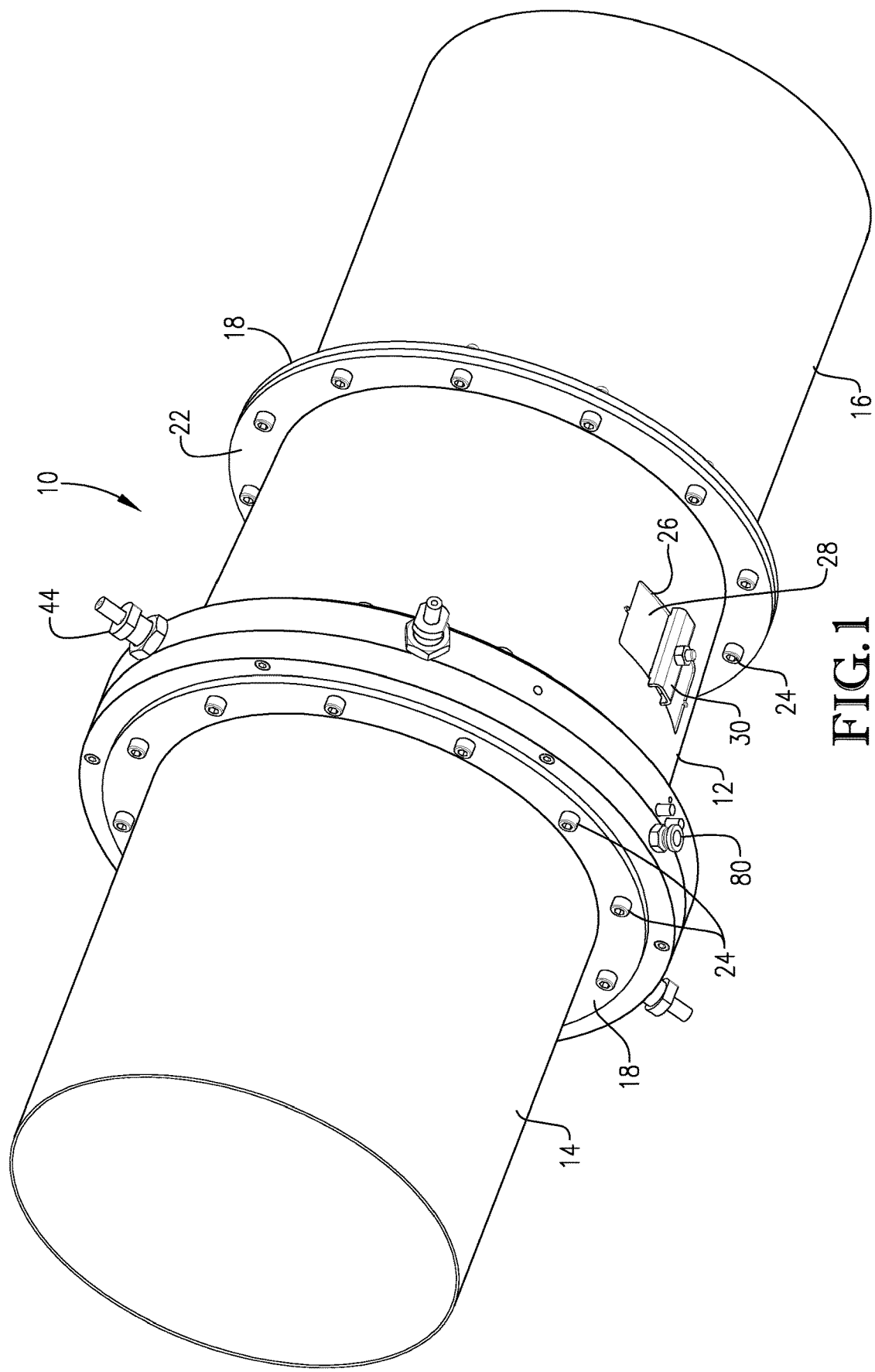
FIG. 1 is an isometric view of a passive isolation valve according to the present invention installed between valve inlet and outlet ducts as might be used with various types of process equipment.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

The following description is intended to illustrate a preferred embodiment of the present invention and should not be viewed as limiting upon the scope of the invention. It will be recognized that not all structures or features described herein are critical to practicing the concepts of the present invention and that the invention can be practiced in alternate ways without departing from the overall spirit thereof.

Turning to FIG. 1, a passive isolation valve 10 is illustrated. The valve 10 comprises a valve body 12 coupled to an inlet duct 14 and an outlet duct 16. Each of ducts 14 and 16 comprises a flange 18 that is configured to be secured to respective body inlet flange 20 and body outlet flange 22, such as with bolts 24. As used herein, the terms "inlet" and "outlet" generally refer to the upstream and downstream sides, respectively, of valve 10 during normal operation thereof in the valve open configuration when installed within process equipment. Thus, the inlet of valve 10 receives the process flow during valve-open operation, which, upon passage through the valve, exits via the outlet of the valve.

Valve body 12 is generally of cylindrical configuration and may be configured with a window 26 that during operation of the valve is covered by a shield 28. Shield 28 is secured to valve body by a closure mechanism 30. Window 26 permits inspection of the interior of valve body 12 without having to decouple the valve body from ducts 14 and 16.

Figure 2:
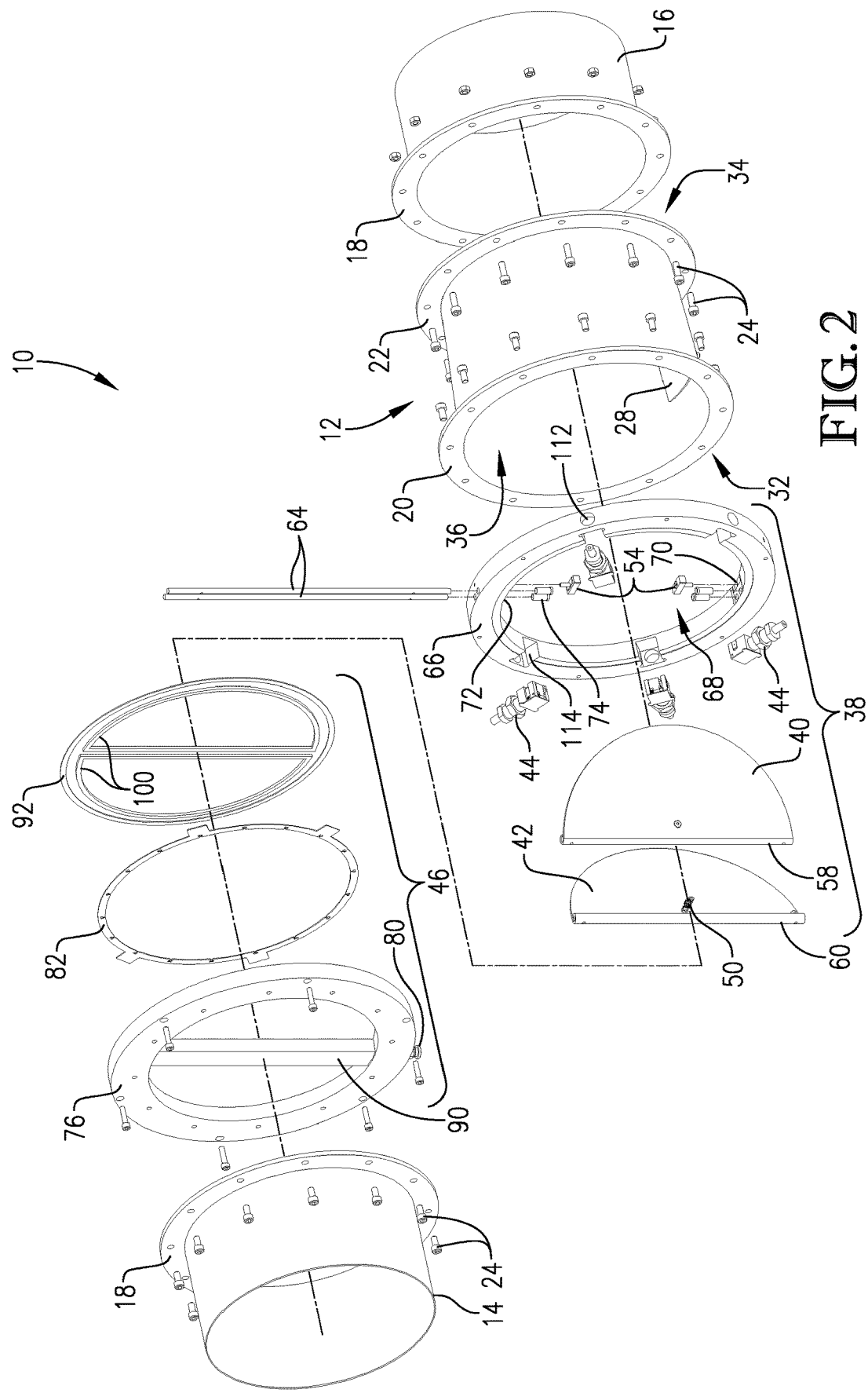
FIG. 2 is an exploded view of the passive isolation valve of FIG. 1.
Figure 3:
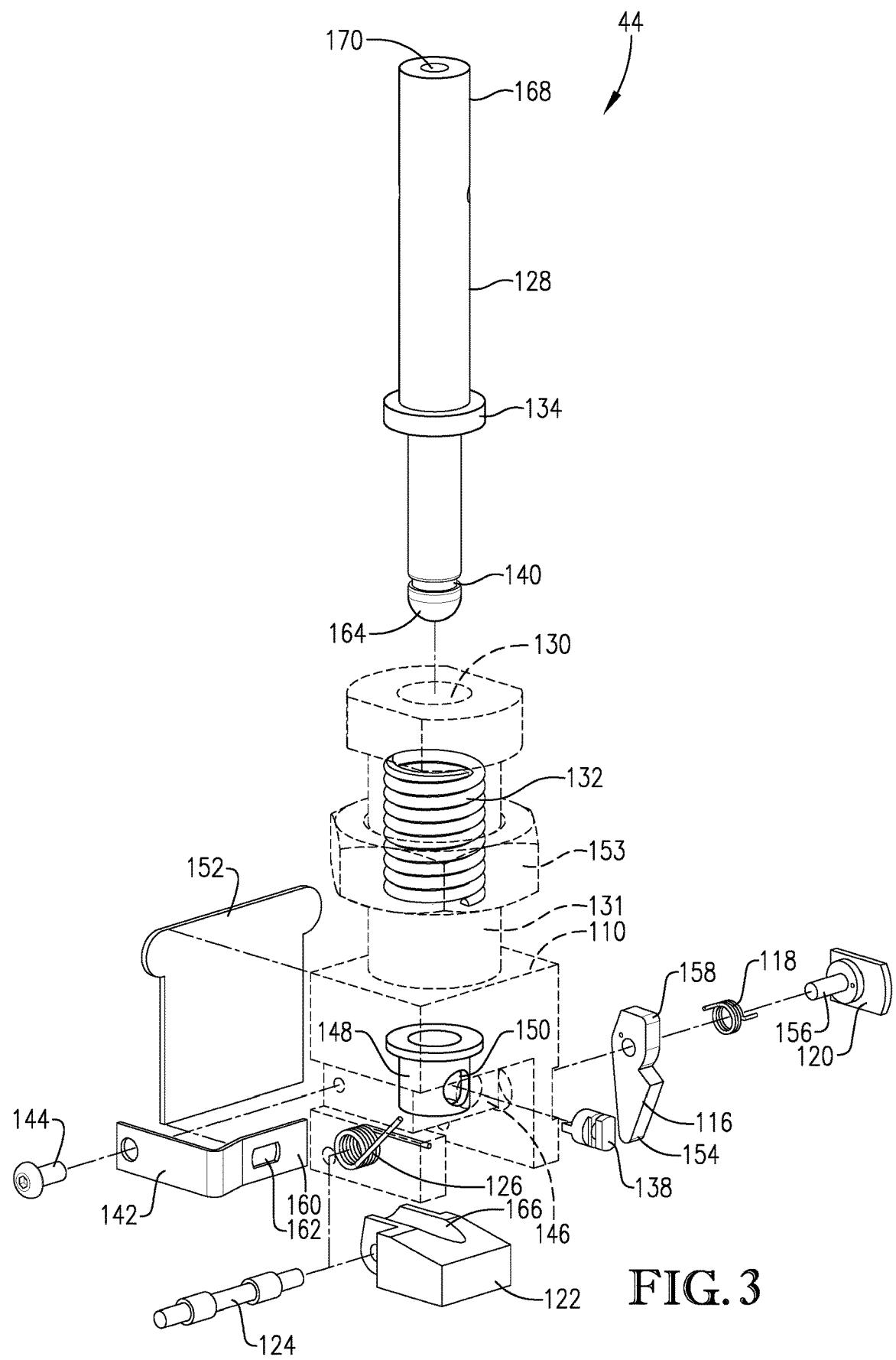
FIG. 3 is an exploded view of a latch assembly that may be used with certain embodiments of the present invention to secure gate members following closure of the valve in response to a downstream energetic event.
Figure 4:
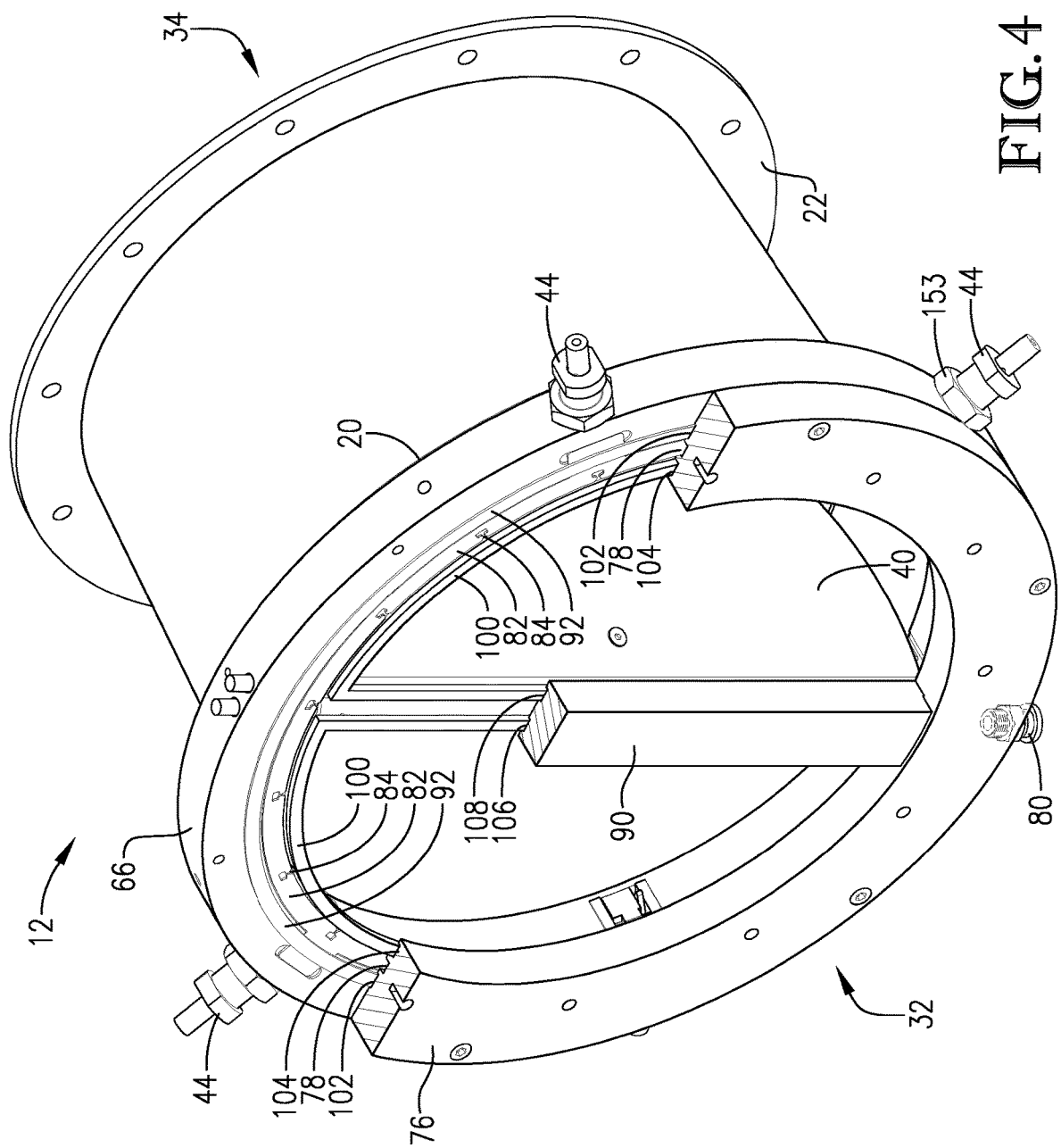
FIG. 4 is an isometric view of the valve from the valve inlet perspective with the gate members in the valve open configuration.
Figure 5:
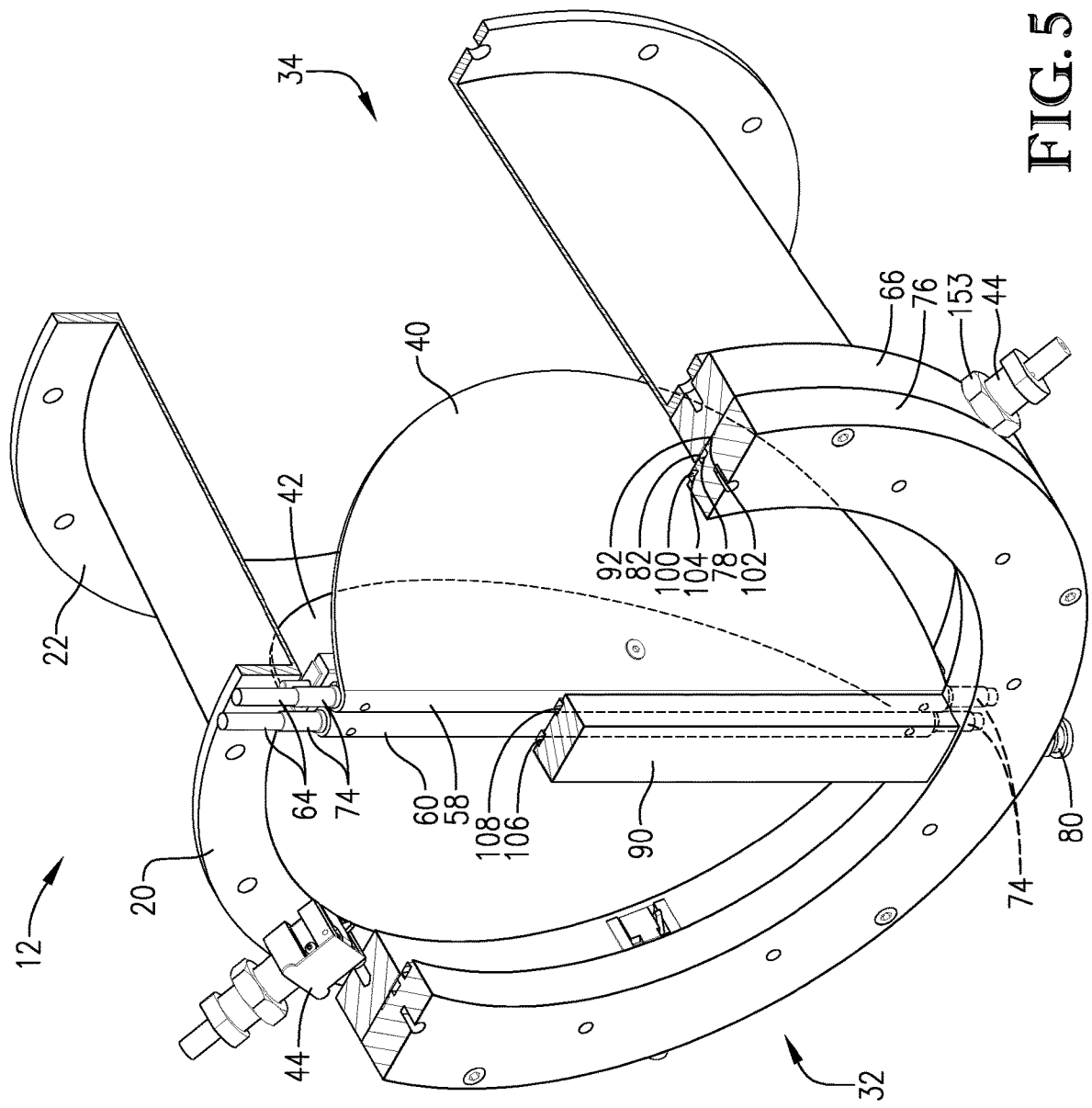
FIG. 5 is a sectioned view of the valve taken from the same perspective as FIG. 4.
Figure 6:
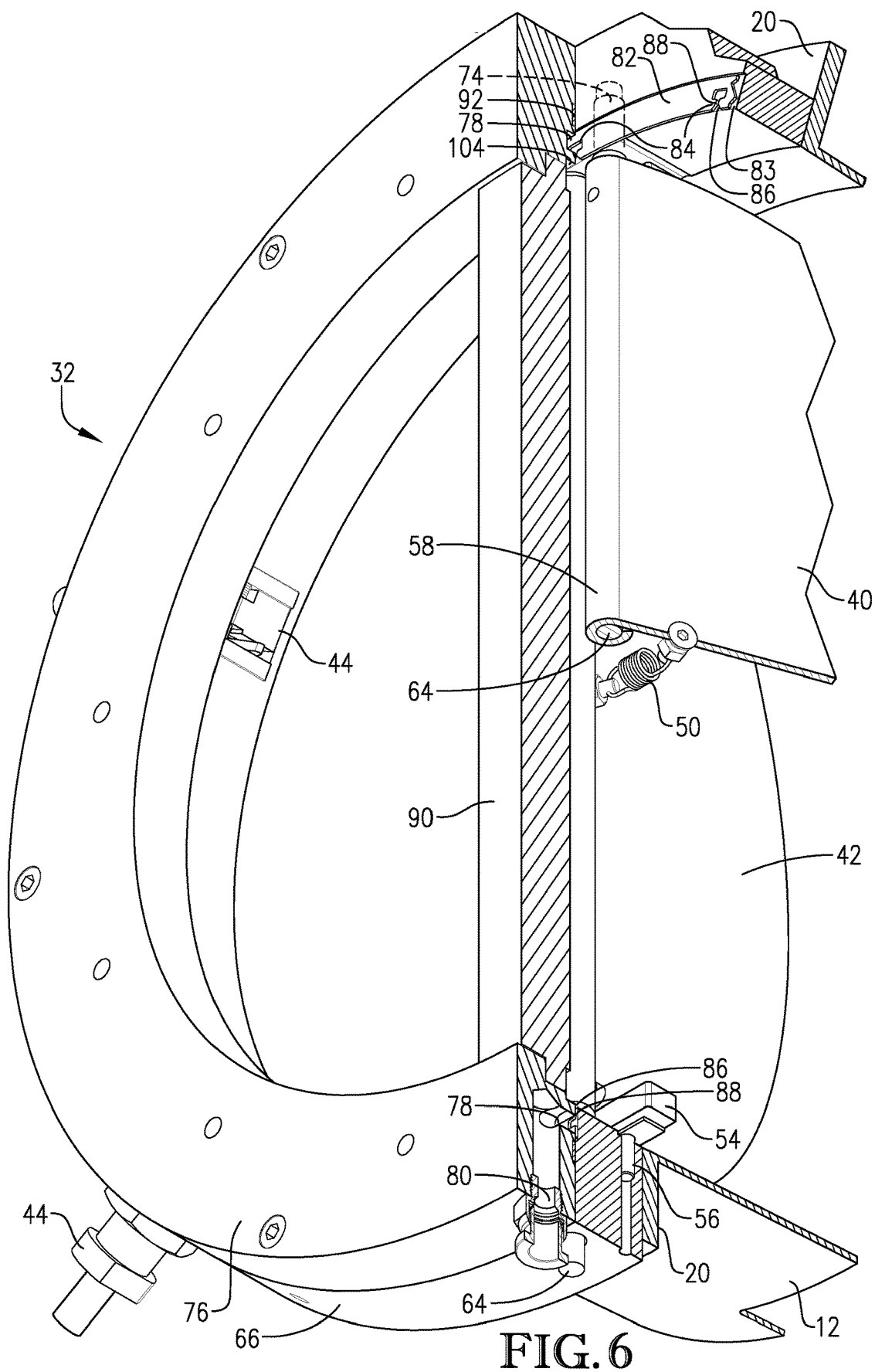
FIG. 6 is a close-up sectioned view of the valve inlet.

FIG. 2 provides an expanded assembly view of the various components of valve 10. Valve body 12 generally comprises a valve inlet 32 and a valve outlet 34 and a passage 36 through the valve body that interconnects inlet 32 and outlet 34. Valve 10 also comprises a gate assembly 38 that comprises at least one, and preferably two, hinged gate members 40, 42. As explained in greater detail below, gate members 40, 42 are shiftable, in response to an energetic event downstream of the valve outlet, between a valve open position, in which the valve inlet 32 is in communication with the valve outlet 34, and a valve closed position, in which the gate members 40, 42 block communication between the valve inlet 32 and the valve outlet 34.

In certain embodiments, the valve 10 may further comprise one or more latch assemblies 44 that are configured to be deployed in response to shifting of the gate members 40, 42 to the valve closed position and to hold the gate members 40, 42 in the valve closed position until it is desired to reopen the valve. A preferred embodiment of latch assembly 44 is described in further detail below.

Figure 7:
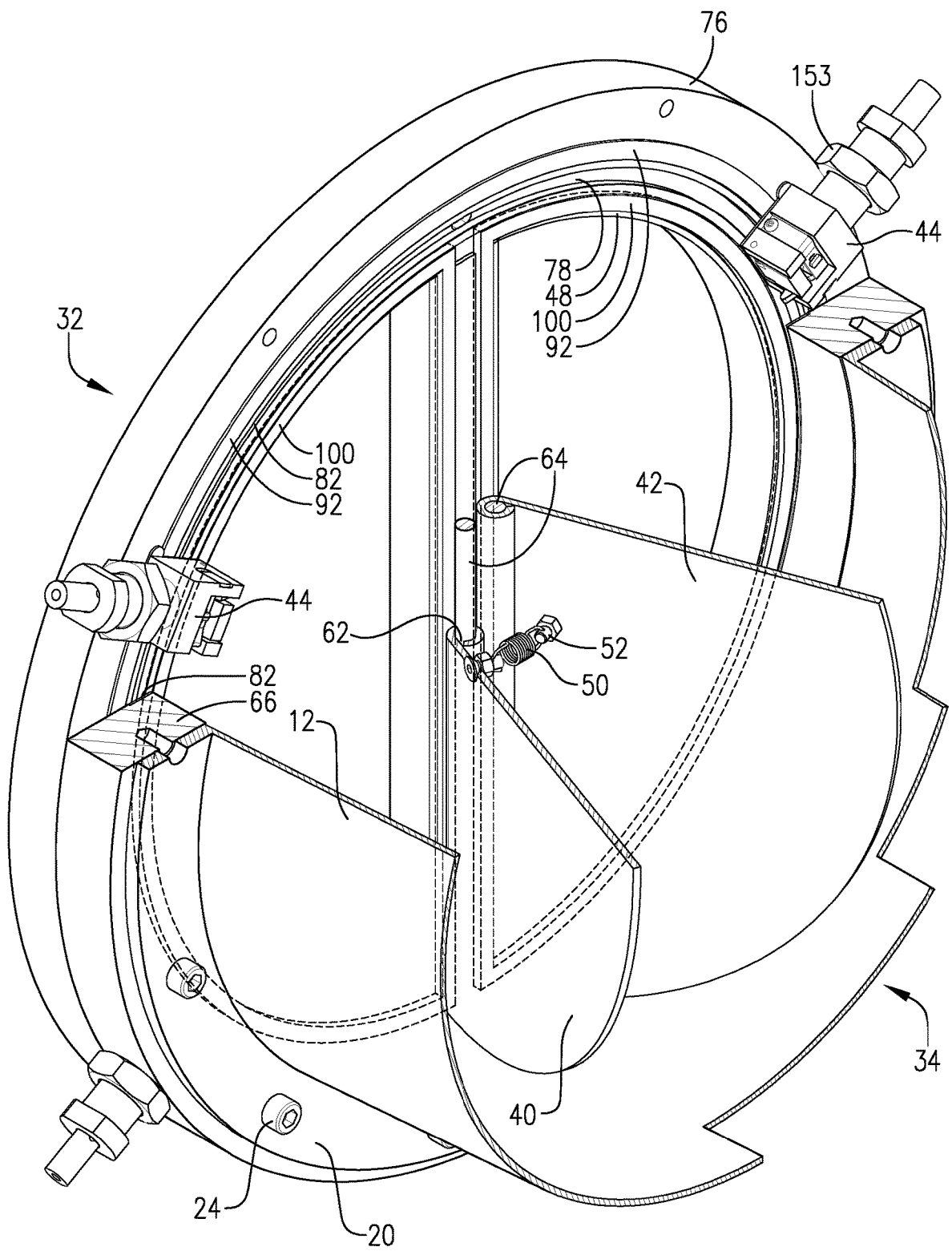
FIG. 7 is a partially sectioned view of the valve inlet taken from a downstream perspective showing the gate members in the valve open configuration.

In certain embodiments, the valve 10 may further comprise a valve seat cleaning assembly 46 that is configured to remove accumulated particulate matter from the vicinity of a seat 48 (see, FIG. 7) for the gate members 40, 42 when the gate members shift from the valve open to the valve closed position. In particular embodiments, the valve seat cleaning assembly 46 utilizes a pressurized gas to cause particulate matter that has settled in the immediate area of the valve seat 48 to become resuspended in a stream of process gas flowing through the valve passage 36. A preferred embodiment of the valve seat cleaning assembly is described in further detail below.

Referring to FIG. 4-9, a preferred embodiment of the gate assembly 38 is depicted. As previously described, gate assembly 38 comprises a pair of gate members 40, 42. Gate members 40, 42 are shown as being independently hinged, which permits the gate members 40, 42 to pivot independently of each other, especially between the valve open and valve closed positions, although this need not always be the case, nor does it mean that the action of each gate member needs to be entirely independent from the other.

It can be desirable to provide a biasing mechanism 50, which may be in the form of a coil spring, that interconnects the gate members 40, 42 and operates to bias the gate members toward the valve open position. Thus, biasing mechanism 50 helps to maintain valve 10 in a maximum state of openness even if the intensity of the flow of the process stream through valve 10 temporarily subsides or is halted completely. When biasing mechanism 50 comprises a coil spring as depicted, each end of the spring may be secured to a post or bolt 52 installed in gate members 40, 42 and affixed to a downstream face 41, 43 of each gate member. In certain embodiments, gate assembly 38 may also include one or more stops 54 that restricts movement of gate members 40, 42 in the valve open position and sets a maximum path of travel for the gate members when the process stream is flowing through valve 10. Stop 54 may be affixed to the valve body 12 or any part thereof, such as mounting ring 66, by fasteners 56. In certain embodiments, stops 54 are configured to permit a maximum path of travel for gate members 40, 42 of approximately 70°, approximately 60°, or approximately 50° relative to the valve closed position. In particular embodiments, valve design is configurable to permit the end user to set the maximum degree of openness for gate members 40, 42 during normal operation of valve 10. This can be accomplished by providing specific mounting positions for the stops 54 or by providing alternate stop geometries that the end user can install. The configuration may take into account the hazard that is likely to be encountered within the process equipment and how quickly the valve 10 needs to be closed to protect upstream equipment.

As illustrated, the inboard segments 58, 60 of each of gate members 40, 42 has been rolled to form an elongate bore 62 into which a hinge pin 64 may be inserted. Thus, in the illustrated embodiment, each gate member 40, 42 pivots about a different axis, although it is preferred for the two pivot axes to be substantially parallel. It will be appreciated that other hinge structures may be employed to mount gate members 40, 42 besides that illustrated in the drawings. For example, the rolled sections 58, 60 of each gate member may be cut away in alternating fashion so that the rolled sections can be fitted together and a single hinge pin 64 used to mount the gate members around a common pivot axis. Still alternatively, the hinge pins may be welded to the gate members so that formation of bore 62 is avoided. Further yet, bore 62 may be formed from a round tube that has been welded onto each gate member 40, 42. Still further yet, round bars may be welded to the gate members, with the ends of the respective round bars being drilled or tapped so that bolts could be inserted in place of hinge pins 64.

It is preferred, although not essential in every embodiment according to the present invention, for gate assembly 38 to be configured such that when valve 10 is installed within particular process equipment, the gate members 40, 42 pivot about a vertically oriented axis or axes. Thus, in these embodiments, the gate members 40, 42 would pivot without regard to the effect of gravity on the pivoting action. Although, it is within the scope of the present invention for gate members 40, 42 to be obliquely oriented with respect to valve body 12 and passage 36 therethrough. It is preferred, however, to avoid configuring gate assembly 38 so that gate members 40, 42 pivot about a horizontal or substantially horizontal axis or axes when valve 10 is installed within process equipment as the force of gravity acting upon members 40, 42 when in the valve open configuration would have to be considered when providing structure to bias the members open or closed as necessary. In particular embodiments, verticality of the pivot axis or axes is provided to an accuracy of ±5°, ±3°, or ±2°.

In certain embodiments, it is possible to mount valve 10 such that the process flow is travelling vertically therethrough. For example, valve 10 may be mounted downstream of a 90° elbow in the process conduit. In such embodiments, the axis or axes about which gate members 40, 42 pivot would no longer be substantially vertically oriented. Rather, the axis or axes about which members 40, 42 pivot would be substantially horizontally oriented. Thus, gravitational effects acting upon gate members 40, 42 would need to be taken into account in designing valve 10 and/or other parts of the system in which the valve is installed. For example, if the process flow is travelling vertically upward through the valve 10 (i.e., against gravity), the effects of gravitational forces acting upon gate members 40, 42 to shift the gate members to the valve closed position would need to be countered. Such forces could be counterbalanced through use of a stronger biasing mechanism 50 to maintain the gate members 40, 42 in the valve open position. If the process flow is travelling vertically downward through the valve (i.e., with gravity), the gravitational forces will tend to assist in maintaining the gate members 40, 42 in the valve open position thereby reducing or eliminating the need for biasing mechanism 50. Alternatively, biasing mechanism 50 could be reconfigured and/or repurposed to provide a valve-closed biasing force so that upon experiencing upstream propagation of an energetic event, biasing mechanism 50 could assist with overcoming gravitational forces encountered during shifting of gate members to the valve closed position. Therefore, instead of being under tension as in the embodiments illustrated in the Figures, biasing mechanism 50 could be provided under compression in this particular embodiment, if necessary.

As illustrated, a mounting ring 66 may be provided to which gate members 40, 42 are directly attached. Mounting ring 66 may then in turn be fastened to the main valve body 12. However, it is within the scope of the present invention for mounting ring 66, or similar structure, to be unitarily formed with valve body 12 rather than provided as a separate part. Mounting ring 66 comprises a central opening 68 configured to align and/or be coaxial with the longitudinal axis of the valve passage 36. In certain embodiments, mounting ring 66 presents substantially the same inner diameter as the main valve body 12, but this need not always be the case. Mounting ring 66 also comprises at least one opening that is generally perpendicular to the central opening 68 through which hinge pin(s) 64 may be received. At least one other opening 72 may be formed in mounting ring 66 opposite from opening(s) 70 in which the distal end of pin(s) 64 may be anchored. Generally, opening 72 need not be a through bore interconnecting the interior and exterior of ring 66 as with opening 70. In addition, one or more bushings 74 may be received within openings 70, 72 and through which pin(s) 64 may be inserted to provide for smoother rotation of gate members 40, 42 and to prevent frictional wear of ring 66 and pin(s) 64.

As noted above, and as illustrated in FIGS. 7-8, valve 10 comprises valve seat 48 which gate members 40, 42 contact when in the valve closed position. Since the valve seat 48 faces a downstream direction relative to normal passage of the process stream through valve 10, a small dead space of limited gas circulation can be created in the immediate vicinity of the seat. Particulate matter suspended within the process stream can settle within this dead space and accumulate. This is problematic as any accumulated particulate material can interfere with full closure of gate members 40, 42 in response to a downstream energetic event. Therefore, certain embodiments of the present invention comprise a valve seat cleaning assembly 46 that functions to remove such accumulated material from the vicinity of valve seat 48 that would interfere with seating of gate members 40, 42 against the valve seat potentially permitting the energetic event to propagate upstream of valve 10 and damage upstream process equipment.

A preferred valve seat cleaning assembly 46 is illustrated in FIG. 2 and comprises an inlet ring 76 that can be fastened to mounting ring 66, or directly to valve body 12, as the case may be. In certain embodiments, inlet ring 76 comprises the valve seat 48; however, it is within the scope of the present invention for the valve seat 48 to be formed within another portion of the valve structure if desired. Inlet ring 76 comprises a gas-directing channel 78, representing a recessed portion of the inlet ring, that is fluidly connected to a gas inlet 80 that is configured to be connected to a source of pressurized gas (not shown). As illustrated, channel 78 essentially forms a complete circle about inlet ring 76 so as to provide cleaning through essentially all 360° of the valve seat; however, this need not always be the case. Gas inlet 80 may be positioned on inlet ring 76 so that gas-directing channel 78 only partially circumscribes ring 76, particularly in and around the bottom region of valve seat 48 where it most likely for particulate materials to accumulate under the force of gravity.

Valve seat cleaning assembly 46 further comprises a gas-dispersing guide 82, which is preferably in the form of a ring-shaped member that encircles the valve inlet 32, although this need not always be the case as noted above. Gas-dispersing guide 82 is installed within a recess 83 formed in mounting ring 66, faces gas-directing channel, 78 and comprises a plurality of ports 84 that are in communication with channel 78 and configured to disperse a gas flowing through the gas-directing channel into the valve passage 36 in the vicinity of the valve seat 48. As used herein, the expression "in the vicinity of the valve seat" refers primarily to that portion of the valve passage 36 that encompasses any dead space in which the velocity of gas circulating there within is insufficient to maintain particulate matter suspended within the gas stream flowing through valve 10, such that the particulate matter may accumulate within the passage. In particular, this expression may also encompass at least a portion of or all the pathway that gate members 40, 42 must travel when transitioning from the valve open to valve closed position, especially the last 5°, the last 3°, or the last 2° of the path of travel of the gate members.

In certain embodiments, ports 84 are distributed substantially uniformly about the gas-dispersing guide 82 so that the gas that is dispersed from the valve seat cleaning assembly 46 is evenly distributed in the specific region of the valve to be treated. In preferred embodiments, ports 84 include respective nozzle 86 and throat sections 88, which act to throttle the flow of gas through the ports to create a jet-like action. The operation of valve seat cleaning assembly 46 is explained in further detail below.

Inlet ring 76 may also be configured with a hinge cover 90 that protects the gate assembly hinge structure. A gasket 92 may be provided and placed between inlet ring 76 and mounting ring 66 to provide a seal to prevent escape of the process stream therebetween. In particular, gasket 92 is received within a recess 102 formed in inlet ring 76. In addition, a pair of D-shaped gaskets 100 are also provided and received within recess 104 formed in inlet ring 76. Recess 104 is located inboard of recess 102 on the inlet ring 76. Hinge cover 90 also comprises recesses 106 and 108 that are also configured to receive respective portions of gaskets 100. D-shaped gaskets 100 are configured to form a part of valve seat 48 and against which gate members 40, 42 contact when in the closed position. Gasket 100 can be made of a material that meets the performance needs of a particular application. Exemplary materials include ethylene propylene diene terpolymer (EPDM), silicon, and nitrile rubber. As mentioned previously, the dead space behind valve seat 48 presents an area in which particulate matter may accumulate and this can negatively affect the ability of the valve to close properly. However, one unexpected benefit of this dead space, though, is that the gaskets 100 remain very well protected from high velocity process media abrasion effects. Thus, the selection of an appropriate gasket material does not have to place as much emphasis on abrasion resistance as other characteristics for the gasket material, which can be an advantage.

FIGS. 10A-10C illustrate more closely an embodiment of a latch assembly 44 according to the present invention. It is noted that the illustrated embodiment represents a preferred type of latch assembly that may be used with the valve 10, and that other latching mechanisms that provide a similar functionality may also be used without departing from the spirit of the present invention. In addition, it is within the scope of the present invention for valve 10 to utilize no latching mechanism at all. The number and positioning of latch assemblies 44 within valve 10 are generally dependent upon the valve diameter and gate member size. The large the valve diameter and gate member size, generally the more latch assemblies that will be used to secure the gate members upon valve closure. If only one latch assembly 44 is required per gate member for a particular application, generally the latch assembly 44 would be positioned at the three-o'clock or the nine-o'clock position (i.e., about 90° from either top or bottom dead center of the valve passage 36) about the mounting ring 66. If more than one latch assembly 44 is required per gate member to ensure sufficient securement of the gate members in the valve closed position, the latch assemblies are preferably uniformly spaced about mounting ring 66. As illustrated in the Figures, two latch assemblies 44 are provided for each of gate members 40, 42. Latch assemblies 44 are spaced about 60° apart from each other, and about 60° from the pivot point for each respective gate member.

Generally, latch assembly 44 is configured to be deployed in response to shifting of the gate members 40, 42 to the valve closed position and to hold the gate members in the valve closed position. Particularly, latch assembly 44 comprises a latch base member 110 to which the various components making up the latch assembly 44 may be secured. Base member 110 may be configured for installation within the valve body 12, or, as illustrated in the figures, within mounting ring 66 through orifices 112 and notches 114.

Latch assembly 44 comprises a trigger 116 that is configured to be contacted by one of gate members 40, 42 during shifting of the gate member between the valve open and valve closed positions. In the illustrated embodiment, trigger 116 is biased toward an undeployed position by a small coil spring 118 and secured thereto by a retaining pin 120. Trigger 116 is configured so that contact with one of gate members 40, 42 causes a securing element 122 to deploy. Securing element 122 is configured to restrict movement of the gate members 40, 42 from the valve closed position until the hazard condition downstream of valve 10 that caused valve 10 to close has subsided and it has been deemed safe to reopen the valve. Securing element 122 restricts movement of the gate members 40, 42 by physically engaging the downstream faces 41, 43 of the gate members to prevent rotational movement about hinge pins 64. Securing element 122 is fastened to base member 110 by a hinge pin 124 and biased toward a retracted or undeployed position by a spring 126.

Latch assembly 44 comprises a shiftable body 128 that is received within a bore 130 formed in a body housing 131 that is threadably received within an orifice 133 formed in base member 110. A spring 132 is positioned within bore 130 and about body 128. Spring 132 is configured to engage a flange 134 extending from body 128 and a shoulder 136 within bore 130. Shifting of body 128 into a retracted position, as illustrated in FIG. 10A, compresses spring 132 in between flange 134 and shoulder 136. Body 128, when retracted and valve 10 is in the valve open position, is held in place by a retaining member 138 that is configured to mate with a groove 140 formed in body 128. Retaining member 138 is connected to an L-shaped flat spring 142 that is secured to base member 110 by a fastener 144. Flat spring 142 is configured to reside generally within a recessed portion 146 of base member 110. A bushing 148 is also provided within bore 130 into which body 128 may be received. Bushing 148 may also include an orifice 150 into which retaining member may be inserted to hold body 128 in the retracted position. A cover 152 may be provided for attachment to base member 110 and to cover mounting ring notch 114 when latching assembly 44 is installed within mounting ring 66. A threaded nut 153 is provided around body housing 131 and is operable to assist with securing latch assembly 44 to mounting ring 66 once installed within notch 114.

It is noted that latch assembly 44 may have applications beyond those described herein and apart from isolation valve 10. Therefore, latch assembly 44 should be viewed as a standalone device with utility that is independent from isolation valve 10, as well as a device that can be used in conjunction with isolation valve 10.

The operation of valve 10 will now be described in greater detail. Valve 10 configured to be installed within process equipment, and particularly intermediate inlet duct 14 and outlet duct 16 in applications to protect upstream process equipment (not shown) from damage due to energetic events occurring downstream of valve 10. Such energetic events include, but are not limited to, explosions associated with detonation of carbon-containing fine particulate materials. Preferably, valve 10 is installed so that gate members 40, 42 are oriented vertically within valve passage 36 and at the inlet or upstream end of the valve. Although, as noted previously, modifications to this configuration are contemplate herein without departing from the scope of the present invention.

A process stream may then be flowed through valve 10. In certain embodiments, the process stream comprises particulate matter suspended in a pneumatic stream. The process stream enters valve 10 and impinges upon gate members 40, 42. If the velocity of the process stream is sufficient, gate members 40, 42 may be shifted to open the valve 10 even more than what is provided by spring 50, and possibly contacting stops 54.

Figure 8:
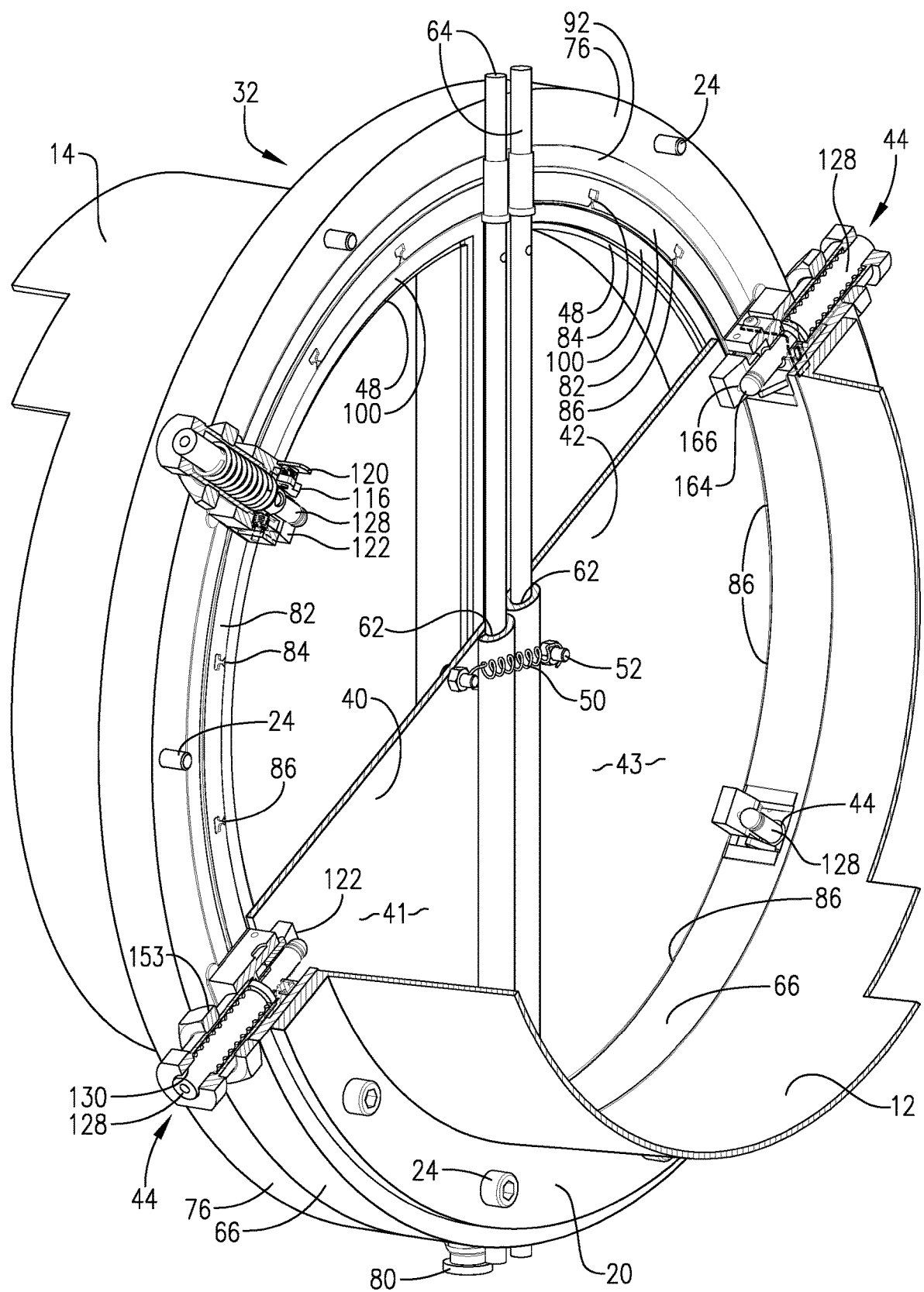
FIG. 8 is a partially sectioned view of the valve inlet taken from a downstream perspective showing the gate members in the valve closed configuration with the latch assemblies deployed.

As noted previously, some portion of the process stream may enter the dead space near valve seat 48 where the velocity of the process gas will be insufficient to keep the particulate material carried thereby suspended. The particulate material may then drop out and accumulate adjacent to the valve seat 48. Preferably, and as illustrated in the Figures, valve 10 is equipped with a valve seat cleaning assembly 46. Gas inlet 80 is coupled to a source of pressurized gas, such as compressed air, which is then conducted through inlet 80 and into gas-directing channel 78. The pressurized gas is delivered into ports 84, and directed through throat sections 88 and nozzle sections 86 and into valve passage 36 in the vicinity of valve seat 48 to remove accumulated particulate material that might prevent seating of gate members 40, 42 during shifting of the gate members to the closed position as depicted in FIG. 8. The pressurized gas supplied to and discharged from valve seat cleaning assembly 46 may be a continuous flow or it can be pulsed with high-intensity bursts occurring at random or regular intervals.

Should an energetic event, such as a detonation, occur downstream of valve 10, valve 10 is configured to respond passively to isolate equipment located upstream of the valve by closing. Valve 10 accomplishes this by harnessing the forces generated by the detonation, such as percussive forces traveling upstream through the process equipment, to shift gate members 40, 42 from a valve open position in which the valve inlet 32 communicates with the valve outlet 34 to a valve closed position in which the gate members block communication between the inlet and outlet. Preferably, and as illustrated in the Figures, valve 10 is equipped with one or more latch assemblies 44 that are configured to secure the gate members 40, 42 in the valve closed position once this shifting has occurred.

Turning now to FIGS. 10A-10C, operation of the latch assemblies is described. FIG. 10A is a close-up view of a latch assembly 44 in its undeployed state, such as when the valve would be normally operating in the valve open position. As gate member 40 pivots about its respective hinge pin 64 in response to the downstream energetic event, the outboard edge of the gate member will contact the tip 154 of trigger 116 thereby causing trigger 116 to rotate about the shaft 156 of retaining pin 120 against the bias of spring 118. This rotation creates a cam-like action in that end 158 of trigger 116 engages end segment 160 of flat spring 142 thereby elevating end segment 160 away from recessed portion 146. This in turn also causes retaining member 138, which passes through slot 162 of flat spring 142 to be displaced laterally and disengage groove 140 of body 128. Once retaining member 138 disengages groove 140, body 128 is released and free to slide within bore 130 under the force of spring 132.

Figure 9:
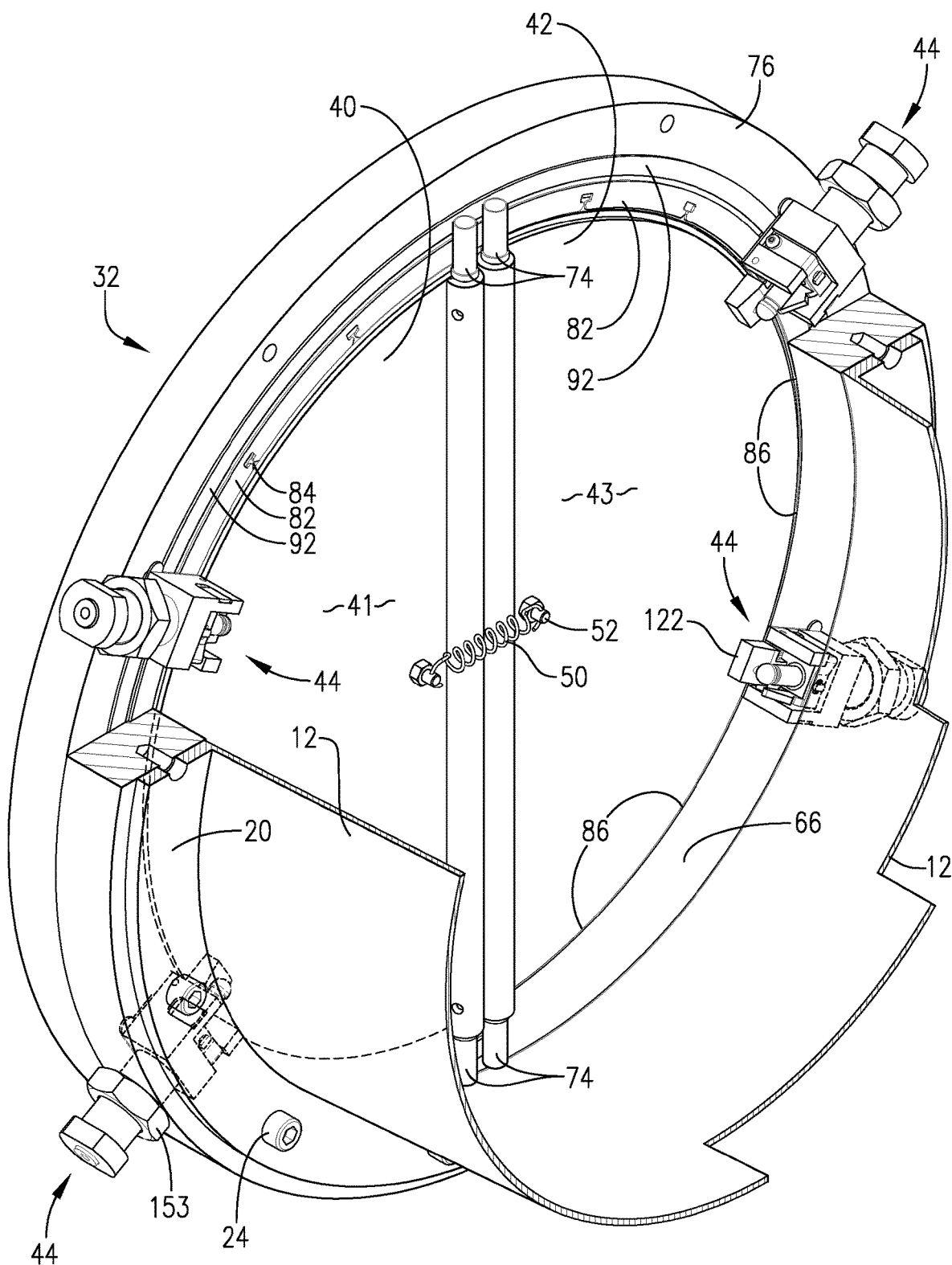
FIG. 9 is another sectioned view of the valve inlet taken from a downstream perspective showing the gate members in the valve closed configuration with the latch assemblies deployed.

As illustrated in FIG. 10B, as body 128 slides under the force of spring 132, the end 164 of the body contacts a groove 166 formed in securing element 122. As body 128 continues to contact securing element 122 and slide through groove 166, securing element shifts against the bias of spring 126 to a deployed position as depicted in FIG. 10C. Further, as can be seen in FIG. 9, securing element now directly engages downstream face 41 of gate member 40 thereby holding gate member 40 against valve seat 48 preventing it from shifting from the valve closed position.

When desired to place valve 10 back into service following the energetic event, the latch assemblies 44 can be reset to an undeployed position so that gate members 40, 42 can be released and be free to pivot to the valve open position once again. To reset latch assembly 44, body 128 is shifted within bore 130 in a direction away from securing element 122 that causes spring 132 to be compressed. Retraction of body 128 can be accomplished by various means. In one embodiment, a tool (not shown) may be attached to distal end 168 of body 128, and in particular by insertion into opening 170, which may be threaded. The operator can the manually shift body 128 against the bias of spring 132 until retaining member 138 becomes locked into groove 140 thereby holding body 128 in the retracted position.

While body 128 is being retracted, it comes out of engagement with securing element 122, which causes spring 126 to shift securing element 122 to the retracted position as illustrated in FIG. 10A and out of contact with gate member 40. Gate member 40, under the biasing influence of spring 50, shifts toward the open position and rotates trigger 116 to a neutral position before trigger 116 can return to the undeployed position resulting from the engagement of holding body 128 and groove 140.

Although not illustrated, it is within the scope of the present invention for valve 10 to be equipped with sensors that provide an operator with operational status information about valve 10. For example, sensors may be placed on gate members 40, 42 to provide real time information regarding the state of openness thereof. Sensors may also be placed in association with latch assemblies 44 to indicate whether a latch assembly has been activated. For example, if one latch assembly has been activated, but not all, such could signal a malfunction of the latch assembly and a need for servicing.

It is understood that the present invention can comprise any one or any combination of structures or features described and that any number of arrangements of the structures and features described herein are possible. For example, passive isolation valves made in accordance with the present invention may comprise any gate members described herein alone or in combination with any latch assembly and/or any valve seat cleaning assembly described herein. Likewise, passive isolation valves made in accordance with the present invention may comprise any latch assembly in combination with any gate member configuration described herein, alone or in combination with any valve seat cleaning assembly described herein. Still further, passive isolation valves made in accordance with the present invention may comprise any valve seat cleaning assembly described herein in combination with any gate member configuration described herein, alone or in combination with any latch assembly described herein. The descriptions of embodiments shown in the Figures should not be taken as limiting upon the scope of the present invention.

We claim:

1. A passive isolation valve comprising:
   a valve body comprising:
      a valve inlet,
      a valve outlet, and
      a passage through the valve body interconnecting the valve inlet and the valve outlet;
   a gate assembly secured to the valve body, the gate assembly comprising:
      a pair of vertically-hinged gate members that are shiftable, in response to an energetic event downstream of the valve outlet, between a valve open position, in which the valve inlet is in communication with the valve outlet, and a valve closed position, in which the pair of vertically-hinged gate members block communication between the valve inlet and the valve outlet, and
      at least one biasing mechanism configured to bias the pair of vertically-hinged gate members toward the valve open position; and
   one or more latch assemblies configured to be deployed in response to shifting of the pair of vertically-hinged gate members to the valve closed position and to hold the pair of vertically-hinged gate members in the valve closed position.

2. The passive isolation valve of claim 1, wherein the gate assembly further comprises a stop that restricts the maximum travel of the pair of vertically-hinged gate members when in the open position.

3. The passive isolation valve of claim 1, wherein the passive isolation valve comprises at least one latch assembly per gate member of the pair of vertically-hinged gate members.

4. The passive isolation valve of claim 1, wherein the pair of vertically-hinged gate members are independently hinged.

5. The passive isolation valve of claim 4, wherein each of the pair of vertically-hinged gate members includes a rolled section that forms an elongate bore configured to receive a hinge pin therethrough.

6. The passive isolation valve of claim 1, wherein the gate assembly further comprises a spring interconnecting the pair of vertically-hinged gate members that biases the pair of vertically-hinged gate members toward the valve open position.

7. The passive isolation valve of claim 6, wherein the spring is connected to a downstream face of each gate member of the pair of vertically-hinged gate members.

8. The passive isolation valve of claim 1, wherein the one or more latch assemblies comprise a trigger, a securing element and a shiftable body.

9. The passive isolation valve of claim 8, wherein the shifting of the pair of vertically-hinged gate members to the valve closed position causes the gate members to contact the trigger of the one or more latch assemblies, which releases the shiftable body, which in turn causes the securing element to contact and maintain the pair of vertically-hinged gate members in the valve closed position.

10. The passive isolation valve of claim 1, wherein the valve comprises a valve seat and a valve seat cleaning assembly that is configured to remove accumulated particulate matter from a vicinity of the valve seat that might interfere with seating of one or both of the pair of vertically-hinged gate members against the valve seat during shifting of the pair of vertically-hinged gate members between the valve open and the valve closed positions.

11. The passive isolation valve of claim 10, wherein the valve seat cleaning assembly comprises a gas-directing channel and a gas-dispersing guide that faces the gas-directing channel, the gas-dispersing guide comprising a plurality of ports that are in communication with the gas-directing channel and configured to disperse a gas flowing through the gas-directing channel into the passage in the vicinity of the valve seat.

12. A passive isolation valve comprising:
a valve body comprising:
a valve inlet,
a valve outlet, and
a passage through the valve body interconnecting the valve inlet and the valve outlet;
a gate assembly secured to the valve body, the gate assembly comprising one or more hinged gate members that are shiftable, in response to an energetic event downstream of the valve outlet, between a valve open position, in which the valve inlet is in communication with the valve outlet, and a valve closed position, in which the one or more hinged gate members block communication between the valve inlet and the valve outlet;
a valve seat against which the one or more hinged gate members contact when in the valve closed position; and
a valve seat cleaning assembly configured to remove accumulated particulate matter from the vicinity of the valve seat that might interfere with seating of the one or more hinged gate members against the valve seat during shifting of the one or more hinged gate members between the valve open and the valve closed positions, the valve seat cleaning assembly comprising:
a gas-directing channel and
a gas-dispersing guide that faces the gas-directing channel, the gas-dispersing guide comprising a plurality of ports that are in communication with the gas-directing channel and configured to disperse a gas flowing through the gas-directing channel into the passage in the vicinity of the valve seat.

13. The passive isolation valve of claim 12, wherein each of the plurality of ports includes respective nozzle and throat sections.

14. The passive isolation valve of claim 12, wherein the one or more hinged gate members are vertically hinged.

15. The passive isolation valve of claim 12, wherein the gas-dispersing guide comprises a ring that encircles the valve inlet.

16. The passive isolation valve of claim 15, wherein the plurality of ports are distributed substantially evenly about the ring.

17. The passive isolation valve of claim 12, wherein the gas-directing channel is formed within an inlet ring secured to the valve body, the gas-directing channel comprising a recessed portion of the inlet ring.

18. The passive isolation valve of claim 17, wherein the inlet ring comprises the valve seat.

19. The passive isolation valve of claim 17, wherein the inlet ring comprises a gas inlet configured to be connected to a source of pressurized gas and to introduce a stream of the pressurized gas into the gas-directing channel.

20. The passive isolation valve of claim 12, wherein the valve further comprises one or more latch assemblies configured to be deployed in response to shifting of the one or more hinged gate members to the valve closed position and to hold the one or more hinged gate members in the valve closed position.

21. The passive isolation valve of claim 20, wherein the one or more latch assemblies comprise a trigger, a securing element, and a shiftable body.

22. The passive isolation valve of claim 21, wherein the shifting of the one or more hinged gate members to the valve closed position causes the one or more hinged gate members to contact the trigger of the one or more latch assemblies, which releases the shiftable body, which in turn causes the securing element to contact and maintain the one or more hinged gate members in the valve closed position.

23. A passive isolation valve comprising:
a valve body comprising:
a valve inlet,
a valve outlet, and
a passage through the valve body interconnecting the valve inlet and the valve outlet;
a gate assembly secured to the valve body, the gate assembly comprising one or more hinged gate members that are shiftable, in response to an energetic event downstream of the valve outlet, between a valve open position, in which the valve inlet is in communication with the valve outlet, and a valve closed position, in which the one or more hinged gate members block communication between the valve inlet and the valve outlet; and
at least one latch assembly configured to be deployed in response to shifting of the one or more hinged gate members to the valve closed position and to hold the one or more hinged gate members in the valve closed position,
the at least one latch assembly comprising:
a trigger configured to be contacted by the one or more hinged gate members during shifting of the one or more hinged gate members between the valve open and valve closed positions,
a securing element configured to restrict movement of the one or more hinged gate members from the valve closed position, and
a shiftable body that is configured, upon activation of the trigger, to move the securing element into engagement with the one or more hinged gate members.

24. The passive isolation valve of claim 23, wherein the one or more hinged gate members are vertically hinged.

25. The passive isolation valve of claim 23, wherein the passive isolation valve comprises a valve seat and a valve seat cleaning assembly that is configured to remove accumulated particulate matter from a vicinity of the valve seat that might interfere with seating of the one or more hinged gate members against the valve seat during shifting of the one or more hinged gate members between the valve open and the valve closed positions.

26. The passive isolation valve of claim 25, wherein the valve seat cleaning assembly comprises a gas-directing channel and a gas-dispersing guide that faces the gas-directing channel, the gas-dispersing guide comprising a plurality of ports that are in communication with the gas-directing channel and configured to disperse a gas flowing through the gas-directing channel into the passage in the vicinity of the valve seat.

27. The passive isolation valve of claim 23, wherein the at least one latch assembly further comprises a retaining member that is configured to maintain the shiftable body in a retracted position when the passive isolation valve is in the valve open position, and wherein the trigger is configured, upon being contacted by the one or more hinged gate members, to shift the retaining member and release the shiftable body.

28. The passive isolation valve of claim 27, wherein the shiftable body comprises a groove into which the retaining member, under the bias of a spring, resides when the shiftable body is in the retracted position.

29. The passive isolation valve of claim 27, wherein the contacting of the trigger by the one or more hinged gate members that causes the retaining member to release the shiftable body permits the shiftable body to move to a deployed position under a force of a shiftable-body spring.

30. The passive isolation valve of claim 29, wherein the shiftable body is configured, upon movement to the deployed position, to contact the securing element thereby causing the securing element to move against the bias of a securing element spring and into engagement with the one or more hinged gate members.

31. The passive isolation valve of claim 29, wherein the at least one latch assembly is resettable to an undeployed position by shifting the shiftable body against the bias of the shiftable-body spring into a retracted position.

32. The passive isolation valve of claim 31, wherein the securing element is configured to return to a retracted position under the bias of the securing element spring upon shifting of the shiftable body into the retracted position.

\* \* \* \* \*